United States Patent
Madden

(10) Patent No.: US 9,762,046 B2
(45) Date of Patent: Sep. 12, 2017

(54) SLEEVE FOR SHIELDING ELECTRICAL JOINT

(71) Applicant: Jeffrey L. Madden, Bernardsville, NJ (US)

(72) Inventor: Jeffrey L. Madden, Bernardsville, NJ (US)

(73) Assignee: Richards Manufacturing Company Sales, Inc., Irvington, NJ (US)

( * ) Notice: Subject to any disclaimer, the term of this patent is extended or adjusted under 35 U.S.C. 154(b) by 45 days.

(21) Appl. No.: 13/865,965

(22) Filed: Apr. 18, 2013

(65) Prior Publication Data

US 2014/0315447 A1    Oct. 23, 2014

(51) Int. Cl.
| H01R 13/52 | (2006.01) |
|---|---|
| H02G 15/18 | (2006.01) |
| H02G 15/115 | (2006.01) |

(52) U.S. Cl.
CPC ....... *H02G 15/1826* (2013.01); *H02G 15/115* (2013.01)

(58) Field of Classification Search
CPC ... H01R 4/72; H01R 4/70; H01R 4/20; H01R 4/206; H01R 4/723

USPC .................. 439/523, 730, 932; 174/87, 84 R
See application file for complete search history.

(56) References Cited

U.S. PATENT DOCUMENTS

| 3,980,374 | A | | 9/1976 | Fallot |
|---|---|---|---|---|
| 5,041,027 | A | | 8/1991 | Lien |
| 5,230,640 | A | * | 7/1993 | Tardif ........................... 439/578 |
| 5,683,273 | A | * | 11/1997 | Garver et al. ................ 439/784 |
| 6,062,917 | A | * | 5/2000 | Kingston ....................... 439/798 |
| 6,472,600 | B1 | * | 10/2002 | Osmani et al. ............. 174/75 R |
| 7,511,222 | B2 | * | 3/2009 | Taylor et al. ................ 174/84 R |
| 7,901,243 | B1 | | 3/2011 | Yaworski |
| 8,070,509 | B2 | * | 12/2011 | Luzzi ............................ 439/489 |
| 8,172,596 | B2 | * | 5/2012 | Siebens ......................... 439/301 |
| 8,502,076 | B2 | * | 8/2013 | Luzzi .............................. 174/93 |
| 8,882,548 | B2 | * | 11/2014 | Siebens ......................... 439/864 |
| 9,059,581 | B2 | * | 6/2015 | Luzzi |
| 2011/0180323 | A1 | * | 7/2011 | Luzzi .......................... 174/84 R |

* cited by examiner

*Primary Examiner* — Hae Moon Hyeon
(74) *Attorney, Agent, or Firm* — Bakos & Kritzer

(57) ABSTRACT

A splice for use in high voltage electrical environment employing a combination of cold-shrink and interference fit in a single splice component allowing for the use of a shortened core at a first cold splice end and the absence of a cable adapter at the interference fit second end.

14 Claims, 3 Drawing Sheets

SLEEVE FOR SHIELDING ELECTRICAL JOINT

CROSS-REFERENCE TO RELATED APPLICATIONS

This application claims priority from U.S. Provisional Patent Application Ser. No. 61/635,835 for "Sleeve for Shielding Electrical Joint," filed Apr. 19, 2012, which is incorporated herein by reference.

FIELD OF THE INVENTION

The present invention disclosed herein relates to the field of high voltage power connectors utilized in power distribution systems. More particularly, the present invention relates to separable electrical connectors and improvements in the assembly of separable electrical connectors including a method for the placement of a premolded high-voltage connector or other removable or permanent electrical insulating device over a high-voltage cable in a safer manner during the assembly and servicing of power distribution systems requiring detaching and reattaching connectors from electrical equipment.

SUMMARY OF THE INVENTION

In order to efficiently transport electricity, conductors are energized at high voltage. Conductors, generally manufactured of conductive metal, are configured into a plurality of wires, commonly referred to in the art as cables. More specifically, in the case of an electric cable carrying electricity from an electrical substation to the vicinity of an end user, the cables—designed to operate up to 35,000 volts under standard conditions—are referred to as distribution cables. In many applications, it is necessary to insulate (i.e., cover the conductor with an electrically insulating material) cables with a partially or fully insulating material.

The primary purpose of splicing is simply to allow for cabling to be sectionalized (i.e., breaking up the lengths of cable into easily pulled sections). In order to allow for uninterrupted service, fault protection, and maintenance, cables must be spliced and joined. The need for high-voltage cable splicing may also arise due to additional cable connection requirements resulting from residential expansion and increasing energy demands. The disconnectable joints, which can mate up to four cables at one junction, need to functionally mate the conductor, insulation, and insulation shield in a manner to allow for the connected cables to operate as one continuous cable. Unlike the splicing of low-voltage devices, which may be accomplished with the use of simple connectors with minimal insulation (frequently constructed of copper, aluminum and like components), high-voltage devices require splices which must maintain proper voltage grading, electrical insulation, and water tightness. To achieve these requirements, premolded high-voltage splices may include the use of one, two, three, or more insulated members. In addition, a tight fitting rubber member or sleeve may also be employed to cover the cable member connections. Due to the fact that the sleeve is generally manufactured of one diameter, cable adapters may be employed to accommodate a broad range of cable diameters. Therefore, in combination, the insulated members, sleeves and cable adapters secure the spliced region, thereby providing for protection against water seepage into the connection. In addition, this type of assembly allows the cable-to-cable splice to achieve the desired voltage and insulation demands. Such a fitting requires a careful and often timely installation process, which involves the connection of opposing cable members to, and/or the placement of cable adapters over, the cable insulation. Cable adapters or cable members are then connected to one another, or to other connector components, to provide a successful splice. Specifically, installation involves the cables being bolted onto the central bus and the sleeves being slid over the cable insulating and mating with the central bus' insulation. It is further known in the art to require additional components to be installed on-site for securing opposing cable adapters or cable members to one another. As a result, as the number of additional installation components increases, more assembly time may be required in the field, which can alter the efficiency of the splicing operation.

For a successful splice, the cable members must fit securely within the corresponding splice components. The inside diameter of the splice component is generally designed to be smaller than the outer diameter of each corresponding cable member (i.e., commonly referred to as the "interference fit.") To insure a snug fit, lubricant may be applied along the outside of the cable members and/or the inside of the cable adapters to assist in the installation process as the cable adapters are pulled over the corresponding cable members.

Cable joints are designed to be disconnected and reconnected without damaging the joint. Typically, such joints are designed such that the joint conductor is manufactured of a solid metal "bus" with flat pads at the terminals. The flat pad connector is mounted onto the cable in a manner designed to be mated to the flat pad of the joint to ensure an effective electrical connection. To complete the joint, the bus is covered with an electrical insulating material and the insulating material is covered with a partially or fully conductive shield. Once the connection is established, it is necessary to restore the continuity of the insulation and insulation shield by using an elastomeric multi-layer sleeve to bridge the cable insulation and shield to the joint insulation and shield.

In order to restore the continuity at the joint while shielding the joint from the elements common in power systems, shields, commonly referred to as sleeves, are designed to provide an interference fit and incorporate heat-shrink characteristics or cold-shrink characteristics to ensure a snug and water-tight joint. For example, a multi-layered sleeve can have an interference fit over the cable and the joint. As mentioned, the inside diameters of the ends of the sleeve are smaller than the outside dimensions of the cable insulation at a first end and smaller than the joint insulation at the second end. The interference fit allows for a continuous insulation covering and provides for a leak-proof submersible design between the cables at the joint. While interference fit designs accomplish the desired objectives in the field, such designs require the addition of cable adapters for mating to cables of various sizes. While the use of additional components is tolerated in the field since cable adapters are necessary to complete a secure splice, it is not ideal in the field as high voltage components often reside in confined spaces underground and the installation proves difficult. Specifically, it is cumbersome to force fit the sleeve over the cable adapter and the joint without dislodging the location of the adapter, thereby compromising the splice. Furthermore, the use of cable adapters creates additional interferences which may result in additional points of fault thereby jeopardizing the integrity of the splice.

Heat-shrink sleeves are manufactured of material which remains at an expanded size and shape at common environment temperatures and conditions. When sufficient heat is applied, the sleeve "shrinks" to form a secure fit between cable insulation/shield to joint insulation/shield. Once reduced to a shrunken state, the elasticity of the material utilized allows for the sleeve to remain at such state with minimal expansion through a wide range of environmental conditions. While this is a common method utilized in the art, several disadvantages are experienced in the field during assembly. For example, the thickness of elastomeric sleeves makes it difficult for a lineman to apply consistent and uniform heat in the confined space common to joint assembly in a high voltage environment. Such difficulty in the field often results in scorching and deformation of the sleeve, rendering the sleeve ineffective in providing a water-resistant secure splice. Furthermore, since consistent and high temperature heat is required, a safety concern is apparent.

In the case of the cold-shrink sleeves, a sleeve is pre-stretched and maintained in an expanded state by using a rigid core inserted therein. The cold-shrink sleeve shrinks to fit tightly over the cable insulation and the joint insulation upon physical removal of the rigid core. Again, while cold-shrink designs accomplish the desired objectives in the field, currently available cold-shrink sleeves known in the art are designed to cold shrink along the entire length of the sleeve, which in current practice is generally greater than twelve inches, and the increased dimension of the sleeve requires a removable core of equal or greater length. As mentioned, components of such length prove difficult to assemble in the confined space common to joint assembly in a high voltage environment and failure of the proper removal of the core may result in complete failure of the joint requiring reinstallation. Further, once installed, the joint is no longer disconnectable, since it is not possible to disassemble the joint without cutting off the sleeve.

Since the methods discussed herein have been employed in the art for decades, numerous disclosures are known in the art that employ the interference fit, heat-shrink characteristics, or cold-shrink characteristics splicing apparatus and methods discussed above. For example, Fallot U.S. Pat. No. 3,980,374, entitled "Separable splice connector," teaches of a separable splice connector for use with 15 to 25 kilovolts and 600 amperes of current. The connector employs a unitary splice body assembly. The splice body assembly is constructed of molded elastic material and may be utilized for providing a straight splice.

A second apparatus comprising a pre-molded high voltage splice is disclosed in Lien U.S. Pat. No. 5,041,027, entitled "Cable splice." Lien discloses a system for electrically connecting a first power cable end to a second power cable end. The splice system comprises a first probe adapted to be electrically connected to the first power cable end and a second probe adapted to be electrically connected to the second power cable end and a cable splice. The cable splice further comprises two ends wherein a first female contact assembly is adapted to engage with the first probe and a second female contact assembly is adapted to engage with the second probe thereby forming a splice.

In a further example, Yaworski U.S. Pat. No. 7,901,243, entitled "Methods and systems for forming a protected disconnectable joint assembly," teaches of a method for forming a protected disconnectable joint assembly using a disconnectable joint assembly wherein the disconnectable coupling mechanism is selectively operable to disconnect the cable connector from the busbar by severing the sleeve, but without severing the secured cable. In short, Yaworksi discloses a cold-shrink sleeve with the cold-shrink portion being on the joint end. The method for assembling the joint assembly includes the use of "an electrical transmission power cable including a conductor and a cable insulation layer covering the conductor, the conductor having a terminal end; an electrically conductive cable connector affixed to the terminal end of the power cable and having a connector coupling portion; a busbar including an electrically conductive busbar body, a busbar coupling portion extending from the busbar body, and a busbar insulation layer covering the busbar body; and a disconnectable coupling mechanism mechanically securing the cable coupling portion to the busbar coupling portion to provide a joint between the cable and the busbar." The Yaworski method requires "maintaining the joint cover assembly in an expanded state using a removable holdout device mounted within the sleeve body; mounting the joint cover assembly on the holdout over the joint between the cable and the busbar; and thereafter removing the holdout device from the joint cover assembly to release the sleeve body to contract onto the disconnectable joint assembly such that the sleeve body circumferentially surrounds the joint between the cable and the busbar, overlaps portions of the cable insulation layer and the busbar insulation layer adjacent the joint, and applies a persistent radially compressive load on the cable insulation layer and the busbar insulation layer."

Numerous other splicing mechanisms employing the referenced apparatus and methods are known and utilized in the art. However, none of the currently employed systems provide for an effective splice utilizing a combination of cold-shrink and interference fit splice components. Current inefficient design tends to make the performance of this type of splicing unduly time-consuming, resulting in increased labor, time, and cost.

Thus, there exists a need for an invention which resolves the limitations of the prior art by providing a suitable means for completing a field splice of common high voltage components employing a combination of cold-shrink and interference fit in a single splice component. The single device of the present invention allows for the use of a shortened core at a first cold splice end and absence of a cable adapter at the interference fit second end.

While aforementioned methods and apparatuses are generally suitable for the particular purpose discussed herein, it is clear that there exists a need in the art for an improved method and apparatus that progresses the state of the art, as well as one that provides the additional benefits enumerated in the present application.

BRIEF DESCRIPTION OF THE DRAWINGS

A further understanding of the present invention and the objectives other than those set forth above can be obtained by reference to the various implementations set forth in the illustrations of the accompanying figures. Although the implementations illustrate certain aspects of the present invention, including the apparatus and method of use of the invention, the present invention, together with further objectives and advantages thereof, may be more easily understood by reference to the drawings, examples, and the following description. The examples and figures are not intended to limit the scope of this invention, which is set forth with particularity in the claims as appended or as subsequently amended, but merely to clarify and exemplify the invention. The detailed description makes reference to the accompanying figures wherein:

DETAILED DESCRIPTION OF THE PRESENT INVENTION

Provided herein is an improved unitary sleeve for splicing high voltage components. This unitary sleeve includes a first end designed to accept a connector and removably attach thereto and a second end to cold shrink over a cable inserted therein to provide improved assembly in the field and eliminate the need for excess components when servicing and establishing high-voltage power systems.

A detailed description of the aforementioned embodiment of the present invention is disclosed herein. However, techniques of manufacture and resulting structures in accordance with the present invention may be embodied in a wide variety of forms and modes, some of which may be quite different from those in the disclosed embodiment. Consequently, the specific structural details disclosed herein are merely representative, yet in that regard, they are deemed to represent suitable implementations for purposes of disclosure and to provide a basis for the claims herein, which define the scope of the present invention. Well known methods, procedures, and substances for both carrying out the objectives of the present invention and illustrating the preferred embodiment are incorporated herein but have not been described in detail as not to unnecessarily obscure novel aspects of the present invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof mean any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or," in reference to a list of two or more items, covers all of the following interpretations of the word: any of the items in the list, all of the items in the list, and any combination of the items in the list.

Figure 1:
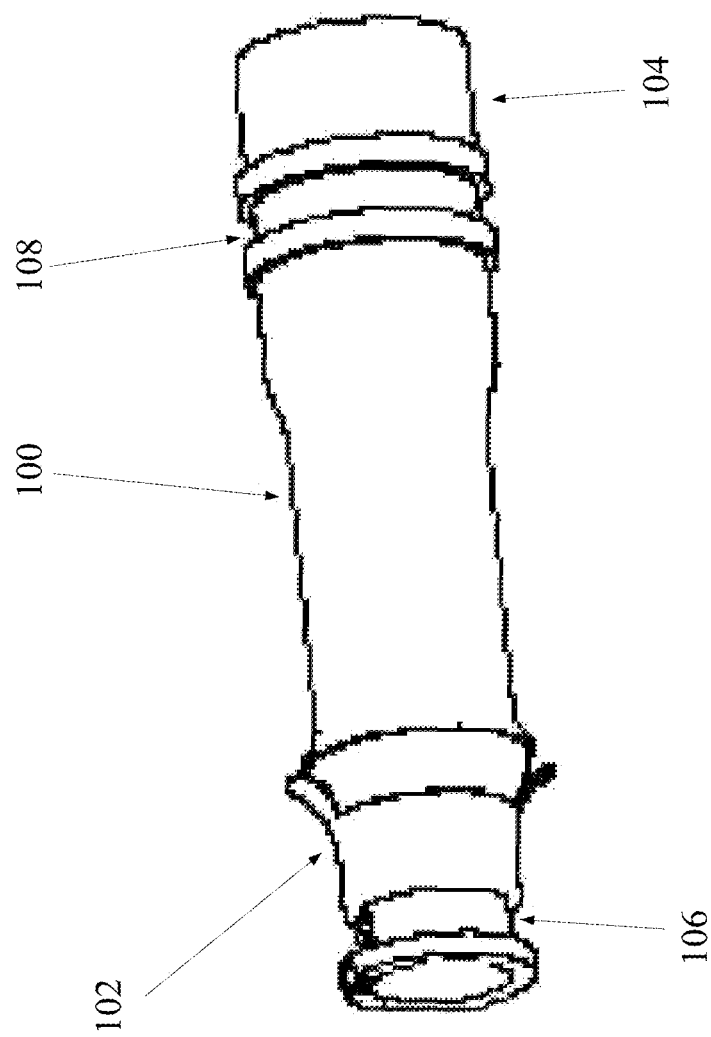
FIG. 1 is a perspective view of the preferred embodiment of the present invention of the splice system.

Turning to FIG. 1, shown is a perspective view of the preferred embodiment of sleeve 100 of the present invention utilized to splice cables in a high voltage system. Cable joints are designed to be disconnected and reconnected without damaging the joint to allow for expansion of the existing high voltage system, as well as service, maintenance, and testing of the high voltage system. Once a joint is created, continuity must be established to restore the connection. Once a splice is created, exposure of the cables and/or the connectors to the elements may yield a fault point in the system. For example, if the splice is not properly insulated from the elements, the intrusion of water in the splice may cause a fault in the system. Thus, it is common in the art to include a snug-fitting sleeve to ensure isolation and protection at the point of the splice.

Figure 3:
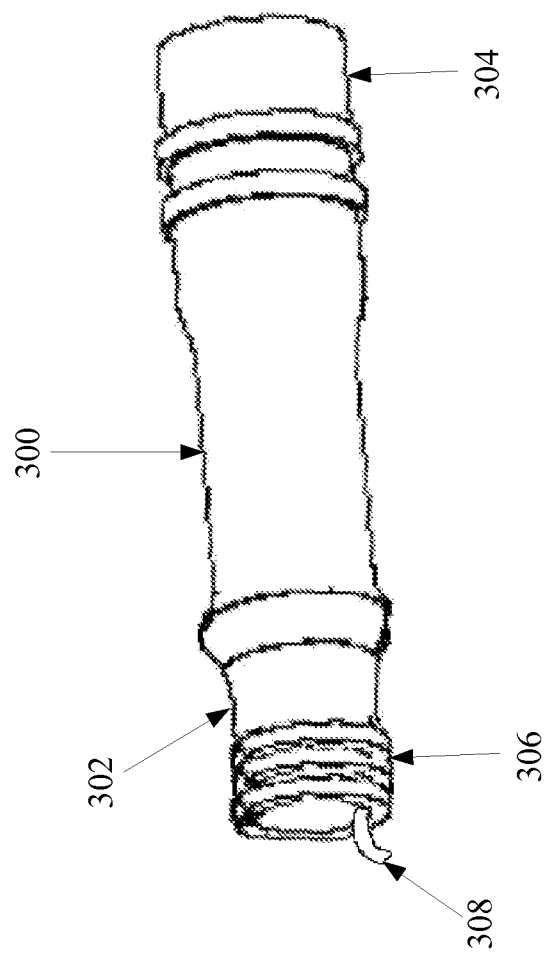
FIG. 3 is a perspective view of an embodiment of the present invention utilizing a spiral ribbon core.

Sleeve 100 is generally tubular and exhibits a substantially hollow center for insulting an electrical splice and carrying an electrical current therethrough. Sleeve 100—including a first end 102 and a second end 104—is primarily manufactured of one of two distinct materials, ethylene propylene diene monomers (EPDM) or silicones, common in the art. First end 102 is designed to act as a common cold-shrink connection well known in the art. In this instance, sleeve 100 is pre-stretched and maintained in an expanded state by a rigid core 106 inserted therein. Once sleeve 100 is positioned over a cable, core 106 is physically removed, or in some instances internally destroyed, and a portion of sleeve 100 shrinks to fit tightly over the cable insulation and the joint insulation. It is contemplated by the present disclosure that any known cold-shrink method and corresponding apparatuses (i.e., generally rubber elastomers with high performance physical properties that have been factory expanded or pre-stretched and assembled onto a supporting and removable rigid core typically manufactured of a high-strength plastic) may be utilized in accordance with the present invention, including but not limited to the use of split core, pop core, break-away core, unwind core, and the like known and utilized in the art as well as similar cores developed in the future which achieve the desired objectives of known cold-shrink components. For example, FIG. 3 illustrates sleeve 300, including a spiral ribbon core 306 at first end 302 and a second end 304. Spiral ribbon core 306 includes a tab 308 configured to unravel spiral ribbon core 306.

Second end 104 of sleeve 100 is designed to accept a component and secure to said connector. In this connection, second end 104 of sleeve 100 is designed to removably or permanently (depending on the desired connector) connect securely by means of an interference fit. In the present embodiment, the inside diameter of the second end 104 of sleeve 100 is smaller than the inner diameter of the component to which it is to be secured. This interference fit allows for a continuous shield covering and provides for a leak-proof submersible design between the cable(s) and connector(s) at the joint. Further, a groove 108 is located adjacent to second end 104 of sleeve 100. Groove 108 encompasses the circumference of sleeve 100 and provides a location for a restraint, such as a hose clamp, to further secure the component to sleeve 100.

Figure 2:
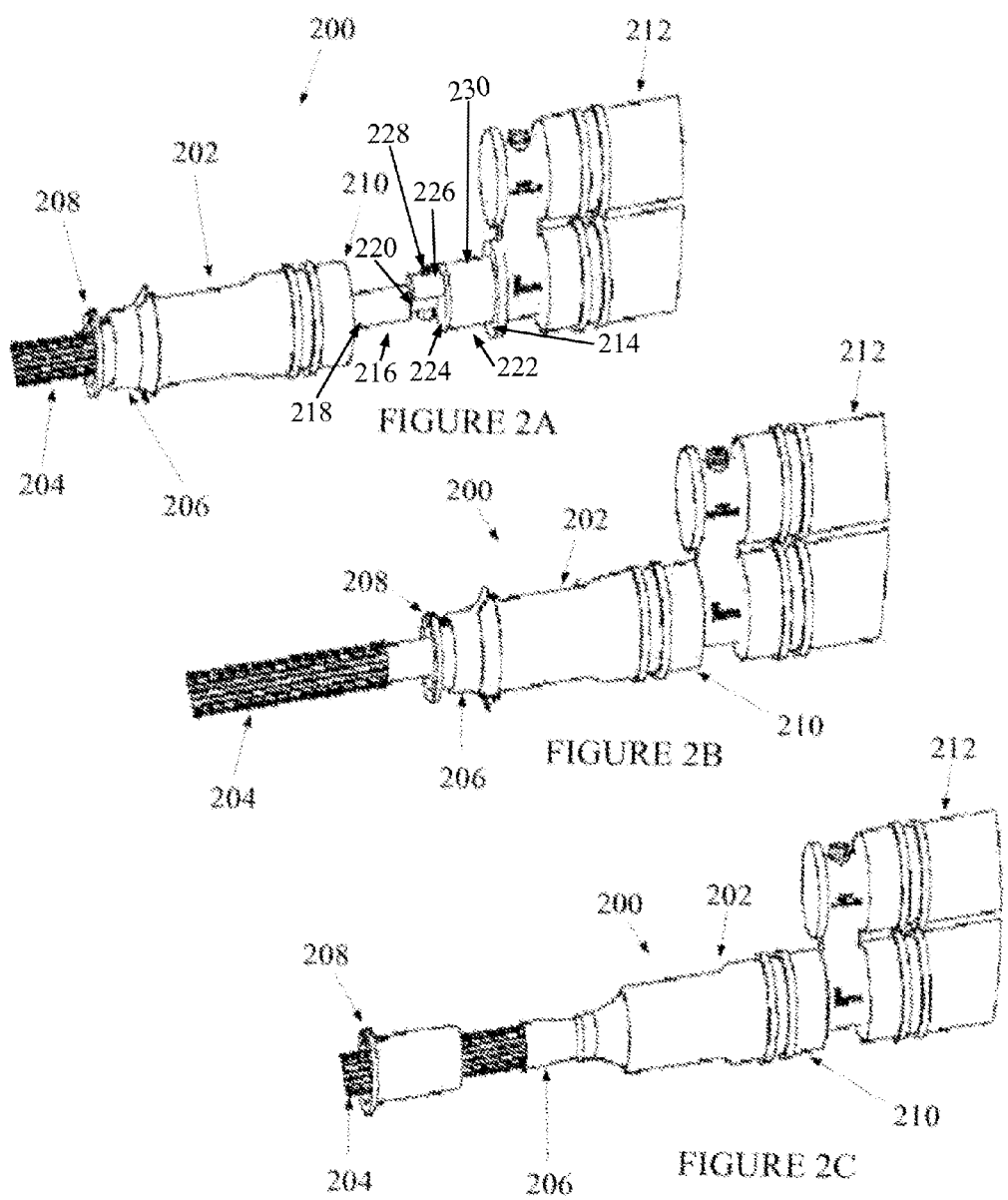
FIG. 2A, FIG. 2B, and FIG. 2C are perspective views depicting the method for installing the splice system, which includes a sleeve designed to utilize an interference fit at one end of the sleeve and a cold-shrink fit at the alternate end of the sleeve in accordance with the preferred embodiment of the present invention.

Turning to the next set of figures, FIGS. 2A, 2B, and 2C are perspective views of the method for installing the splice system 200 of the preferred embodiment of the present invention depicted in a series of steps and related figures. In the present method, an open joint is created and exposed cable 204 is prepared. In a typical cable installation, insulation is stripped back from the cable end of the termination preparation. The insulation shield is also pulled back away from the cable end. Further, the outer cable jacket is stripped back beyond the insulation shield. In addition, the insulation is chamfered to reduce assembly forces resulting from the insertion of cable preparation into a premolded expandable product (i.e., sleeve 202). Prepared cable 204 is secured to probe 214 of common component 212 with cable connector 216. Cable connector 216 comprises cable socket 218 and pad 220. Cable connector 216 is coupled to bus 222 of probe 214. In the present method, bus 222 is a busbar having a body 224 and coupling portion 226. Bus 222 is preferably covered with insulation layer 230. Pad 220 is coupled to busbar coupling portion 226 with bolt 228. As shown in FIG. 2A, prepared cable 204 is inserted into first end 206 of sleeve 202 and further within rigid core 208 removably fixed therewithin, effectively expanding cold-shrink first end 206 of sleeve 202. Cold-shrink first end 206 of sleeve 202 is in an expanded state to allow for a lineman to position cable 204 within first end 206 of sleeve 202 without requiring substantial force imparted by a lineman performing the splice. At second end 210 of sleeve 202, inside diameter of second end 210 of sleeve 202 is designed smaller than the outside diameter of a probe 214 of common component 212. While one of ordinary skill in the art will readily recognize, component 212 may be any known splice component commonly used in the art such as disconnectable I-bus, Y-bus, or H-bus joint component. The respective diameters of component 212 and second end 210 of sleeve 202 allows for an interference fit once sleeve 202 is forced over probe 214 of component 212 as shown in FIG. 2B. This interference fit generates a continuous insulation covering and provides for a leak-proof submersible design between the cables and components at the joint. To complete the splice, rigid core 208 is manually removed by the lineman at the point of the splice by withdrawing rigid core 208 from first end 206 of sleeve 202. Upon removal of rigid core 208, first end 206 of sleeve 202 shrinks to fit tightly over the cable insulation thereby forming a resistant and snug splice at cable portion of joint as the memory action of the specially formulated material ensures a permanent, durable environmental seal and insulation.

While certain aspects of the device are presented below in certain claim forms, the inventor contemplates the various aspects of the apparatus and method in any number of claim forms. Accordingly, the inventor reserves the right to add additional claims after filing the application to pursue such additional claim forms for other aspects of the apparatus and method.

Thus, there has been summarized and outlined, generally in broad form, a plurality of the most important features of the present invention. While this summary is presented so that the novelty of the present contribution to the related art may be better appreciated, it will further be apparent that additional features of the invention described hereinafter (which will form the subject matter of the claims appended hereto) will further define the scope, novelty, and in certain instances the improvements upon any existing art. The following description provides specific details for a thorough understanding of, and enabling description for, various examples of the improvement in the described field of art. One skilled in the art will understand that the method and apparatus may be practiced without many of these details, and it is to be readily understood that the invention presented herein is not limited in its application to the details of construction and to the arrangements of the components set forth in the following description or illustrated in the various figures integrated and categorized herein. For example, in some instances, well-known structures and functions have not been shown or described in detail to avoid unnecessarily obscuring the description of the examples of the invention. It is intended that the terminology used in the description presented below be interpreted in its broadest reasonable manner, even though it is being used in conjunction with a detailed description of certain examples of the invention. Although certain terms may be emphasized, any terminology intended to be interpreted in any restricted manner will be overtly and specifically defined as such in this detailed description section. Those skilled in the art will appreciate that the disclosure of the present invention may readily be utilized as a basis for the designing of other similar structures, methods, and systems for carrying out the various purposes and objectives of the present invention.

I claim:

1. A joint assembly comprising:
   a sleeve having a first end and a second end for insulating an electrical splice in a high voltage system;
   a core disposed within said first end;
   wherein said second end is designed to mate with a bus and secure to a component utilizing an interference fit;
   wherein the sleeve is multi-layer;
   wherein said core is rigid and removably attached so that upon removal of said core, said first end shrinks to tightly secure around a prepared cable inserted therein;
   wherein said prepared cable does not include a cable adapter; and
   wherein said first end and said second end are substantially parallel.

2. The joint assembly of claim 1, wherein the sleeve is manufactured of EPDM.

3. The joint assembly of claim 1, wherein the core is a spiral ribbon core.

4. The joint assembly of claim 1, wherein the core is a solid pullout core.

5. The joint assembly of claim 1, wherein the sleeve comprises a circumferential groove positioned adjacent to the second end.

6. A joint assembly comprising:
   a sleeve manufactured of EPDM having a first end and a second end for insulating an electrical splice in a high voltage system;
   a core disposed within said first end;
   wherein said second end is designed to mate with a bus and secure to a component utilizing an interference fit;
   wherein the sleeve is multi-layer; and
   wherein said core is rigid and removably attached so that upon removal of said core, said first end shrinks to tightly secure around an end of a prepared cable, wherein said prepared cable does not include a cable adapter and said prepared cable is inserted through said first end and said second end.

7. The joint assembly of claim 6, wherein the core is a spiral ribbon core.

8. The joint assembly of claim 6, wherein the core is a solid pullout core.

9. The joint assembly of claim 6, wherein the sleeve comprises a circumferential groove positioned adjacent to the second end.

10. A method for providing a high voltage joint assembly comprising:
    a prepared electrical transmission power cable including a conductor and a cable insulation layer covering the conductor, wherein the conductor includes a terminal end and said prepared electrical transmission power cable does not include a cable adapter;
    an electrically conductive cable connector affixed to the terminal end of the prepared electrical transmission power cable and having a connector coupling portion;
    a multi-layer sleeve having a first end and a second end for insulating an electrical splice and carrying an electrical current there through;
    a rigid core disposed at said first end;
    a busbar including an electrically conductive busbar body, a busbar coupling portion extending from the busbar body, and a busbar insulation layer covering the busbar body;
    wherein said second end of sleeve is designed to mate with the busbar and secure to a component utilizing an interference fit and wherein said rigid core is removably attached so that upon removal of said rigid core said second end shrinks to tightly secure around the prepared electrical transmission power cable inserted therein;

maintaining the high voltage joint assembly in an expanded state; and releasing the sleeve by removing said rigid core to contract onto the high voltage joint assembly such that the sleeve circumferentially surrounds the high voltage joint assembly between the prepared electrical transmission power cable and the busbar, overlaps portions of the cable insulation layer and the busbar insulation layer adjacent the high voltage joint assembly, and applies a persistent radially compressive load on the cable insulation layer and the busbar insulation layer.

11. The method of claim 10, wherein the sleeve is manufactured of EPDM.

12. The method of claim 10, wherein the rigid core is a spiral ribbon core.

13. The method of claim 10, wherein the rigid core is a solid pullout core.

14. The method of claim 10, wherein the sleeve comprises a circumferential groove positioned adjacent to the second end.

* * * * *